US005309552A

United States Patent [19]

Horton et al.

[11] Patent Number: 5,309,552

[45] Date of Patent: May 3, 1994

[54] PROGRAMMABLE MULTI-FORMAT DISPLAY CONTROLLER

[75] Inventors: Robert S. Horton, Hurley; Ralph C. Mitchell, Kingston, both of N.Y.; Walter G. Temnycky, Aberdeen, N.J.

[73] Assignee: International Business Machines Corporation, Armonk, N.Y.

[21] Appl. No.: 782,889

[22] Filed: Oct. 18, 1991

Related U.S. Application Data

[63] Continuation of Ser. No. 246,726, Sep. 20, 1988, abandoned.

[51] Int. Cl.[5] .......... G06F 15/66

[52] U.S. Cl. .......... 395/131; 395/129; 395/150

[58] Field of Search .......... 364/518, 521, 522; 340/747, 750, 798, 799; 382/48; 395/150, 151, 129, 131

[56] References Cited

U.S. PATENT DOCUMENTS

| | | | |
|---|---|---|---|
| 4,528,552 | 7/1985 | Moriyama et al. | 340/525 |
| 4,653,021 | 3/1987 | Takagi | 364/900 |
| 4,815,012 | 3/1989 | Feintuch | 364/521 |
| 4,817,166 | 3/1989 | Gonzalez et al. | 382/1 |
| 4,882,683 | 11/1989 | Rupp et al. | 364/521 |
| 4,908,779 | 3/1990 | Iwata | 364/518 |
| 4,951,229 | 8/1990 | DiNicola et al. | 364/521 |
| 4,954,970 | 9/1990 | Walker et al. | 364/521 |
| 4,967,378 | 10/1990 | Rupel et al. | 364/518 |
| 4,991,120 | 2/1991 | Vaiana | 364/521 |

FOREIGN PATENT DOCUMENTS

| | | | |
|---|---|---|---|
| 0148578 | 7/1985 | European Pat. Off. | G09G 1/16 |
| 0165441 | 12/1985 | European Pat. Off. | G09G 1/28 |
| 0258560 | 3/1988 | European Pat. Off. | G09G 1/16 |
| WO82/01614 | 5/1982 | World Int. Prop. O. | G09G 1/16 |

*Primary Examiner*—Phu K. Nguyen
*Attorney, Agent, or Firm*—Mark S. Walker; William A. Kinnaman, Jr.

[57] ABSTRACT

A programmable display controller allows reconfiguration of bit plane memory and video output connections based upon the type of display device employed. The display controller allows for the definition of multiple bit planes when the display device supports color or multiple gray shades. Simultaneous storage of images to all defined planes is accomplished through the use of multi-store logic. Multi-store logic transforms a data stream defining foreground and background portions of an image within a given display area into a form that can be simultaneously written to the bit planes as required to create the necessary output. Under processor control, a video palette may be loaded to ensure that display output signals are routed to the correct connector pins. The routing of particular signals to particular pins is reconfigured through the selection and loading of the applicable video palette. Video connector leads are connected to the palette generated data signals or to electrical ground by means of reconfigurable jumpers. The number of bit planes and display pages can be readily modified with a multi-mode controller translating the selected mode into the required bit plane memory control signals.

4 Claims, 17 Drawing Sheets

• = BACKGROUND PEL
0 = FOREGROUND PEL

FIG. 4a

| | LEGEND |
|---|---|
| 0 | STORE ALL 0'S IN BITPLANE |
| 1 | STORE ALL 1'S IN BITPLANE |
| N | STORE NEGATIVE IMAGE IN BITPLANE |
| P | STORE POSITIVE IMAGE IN BITPLANE |

NOTE:
ORDER OF ENTRIES IS "4"PLANE, "2"PLANE, "1"PLANE

BACKGROUND ↓ / FOREGROUND →

| BACKGROUND \ FOREGROUND | BLACK | SHADE1 | SHADE2 | SHADE3 | SHADE4 | SHADE5 | SHADE6 | BRIGHT |
|---|---|---|---|---|---|---|---|---|
| BLACK | 000 | 00P | 0P0 | 0PP | P00 | P0P | PP0 | PPP |
| SHADE1 | 00N | 001 | 0PN | 0P1 | P0N | P01 | PPN | PP1 |
| SHADE2 | 0N0 | 0NP | 010 | 01P | PN0 | PNP | P10 | P1P |
| SHADE3 | 0NN | 0N1 | 01N | 011 | PNN | PN1 | P1N | P11 |
| SHADE4 | N00 | N0P | NP0 | NPP | 100 | 10P | 1P0 | 1PP |
| SHADE5 | N0N | N01 | NPN | NP1 | 10N | 101 | 1PN | 1P1 |
| SHADE6 | NN0 | NNP | N10 | N1P | 1N0 | 1NP | 110 | 11P |
| BRIGHT | NNN | NN1 | N1N | N11 | 1NN | 1N1 | 11N | 111 |

FIG. 4b

| LEGEND | |
|---|---|
| 0 | STORE ALL 0'S IN BITPLANE |
| 1 | STORE ALL 1'S IN BITPLANE |
| N | STORE NEGATIVE IMAGE IN BITPLANE |
| P | STORE POSITIVE IMAGE IN BITPLANE |

NOTE:
ORDER OF ENTRIES
IS
RED PLANE,
GREEN PLANE,
BLUE PLANE

FOREGROUND

| BACKGROUND ↓ | BLACK | BLUE | GREEN | TURQ. | RED | PURPLE | YELLOW | WHITE |
|---|---|---|---|---|---|---|---|---|
| BLACK | 000 | 00P | 0P0 | 0PP | P00 | P0P | PP0 | PPP |
| BLUE | 00N | 001 | 0PN | 0P1 | P0N | P01 | PPN | PP1 |
| GREEN | 0N0 | 0NP | 010 | 01P | PN0 | PNP | P10 | P1P |
| TURQ. | 0NN | 0N1 | 01N | 011 | PNN | PN1 | P1N | P11 |
| RED | N00 | N0P | NP0 | NPP | 100 | 10P | 1P0 | 1PP |
| PURPLE | N0N | N01 | NPN | NP1 | 10N | 101 | 1PN | 1P1 |
| YELLOW | NN0 | NNP | N10 | N1P | 1N0 | 1NP | 110 | 11P |
| WHITE | NNN | NN1 | N1N | N11 | 1NN | 1N1 | 11N | 111 |

FIG. 5a
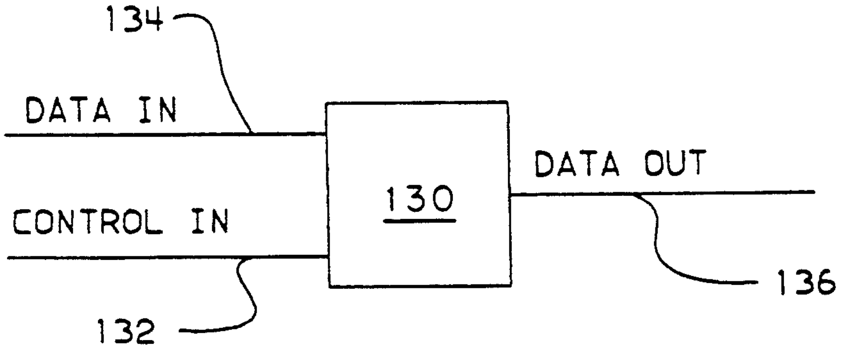
FIG. 5b
| CODE | CONTROL | OUTPUTS |
|---|---|---|
| P | 0 0 | =INPUTS |
| N | 0 1 | =NINPUTS |
| 0 | 1 0 | 0'S |
| 1 | 1 1 | 1'S |
FIG. 7
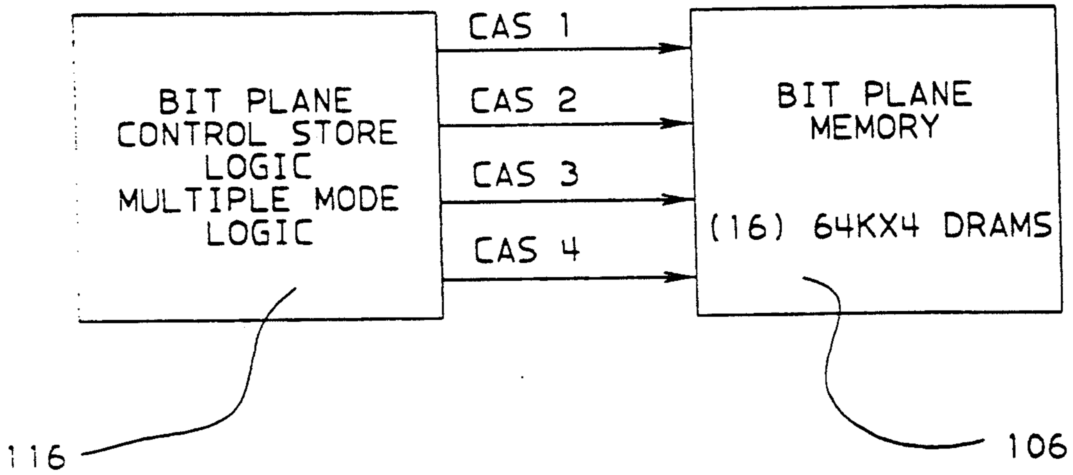

FIG. 8a

TABLE 1
MODE 4: BY-4

| | | | | | | | |
|---|---|---|---|---|---|---|---|
| 011 | 1111 | 1111 | 2222 | 2222 | 2233 | | |
| 901 | 2345 | 6789 | 0123 | 4567 | 8901 | | |
| 1XX | X1-0 | 0XXX | XXXX | XXXX | XXXX | PAGE 1 | PLANE 1 |
| 1XX | X1-0 | 1XXX | XXXX | XXXX | XXXX | PAGE 2 | PLANE 1 |
| 1XX | X1-1 | 0XXX | XXXX | XXXX | XXXX | PAGE 3 | PLANE 1 |
| 1XX | X1-1 | 1XXX | XXXX | XXXX | XXXX | PAGE 4 | PLANE 1 |
| 1XX | 1X-1 | 0XXX | XXXX | XXXX | XXXX | PAGE 1 | PLANE 2 |
| 1XX | 1X-0 | 1XXX | XXXX | XXXX | XXXX | PAGE 2 | PLANE 2 |
| 1XX | 1X-1 | 0XXX | XXXX | XXXX | XXXX | PAGE 3 | PLANE 2 |
| 1XX | 1X-1 | 1XXX | XXXX | XXXX | XXXX | PAGE 4 | PLANE 2 |
| 1X1 | XX-0 | 0XXX | XXXX | XXXX | XXXX | PAGE 1 | PLANE 3 |
| 1X1 | XX-0 | 1XXX | XXXX | XXXX | XXXX | PAGE 2 | PLANE 3 |
| 1X1 | XX-0 | 0XXX | XXXX | XXXX | XXXX | PAGE 3 | PLANE 3 |
| 1X1 | XX-1 | 1XXX | XXXX | XXXX | XXXX | PAGE 4 | PLANE 3 |
| 11X | XX-0 | 0XXX | XXXX | XXXX | XXXX | PAGE 1 | PLANE 4 |
| 11X | XX-0 | 1XXX | XXXX | XXXX | XXXX | PAGE 2 | PLANE 4 |
| 11X | XX-1 | 0XXX | XXXX | XXXX | XXXX | PAGE 3 | PLANE 4 |
| 11X | XX-1 | 1XXX | XXXX | XXXX | XXXX | PAGE 4 | PLANE 4 |

8-RAS MUX WITH 8-CAS (ADR BITS 15-30) — ADR BIT 31= HI/LO BYTE

TABLE 2
MODE 2 BY-2

| | | | | | | | |
|---|---|---|---|---|---|---|---|
| 011 | 1111 | 1111 | 2222 | 2222 | 2233 | | |
| 901 | 2345 | 6789 | 0123 | 4567 | 8901 | | |
| 1XX | X10X | XXXX | XXXX | XXXX | XXXX | PAGE 1 | PLANE 1 |
| 1XX | X11X | XXXX | XXXX | XXXX | XXXX | PAGE 2 | PLANE 1 |
| 1XX | 1X0X | XXXX | XXXX | XXXX | XXXX | PAGE 1 | PLANE 2 |
| 1XX | 1X1X | XXXX | XXXX | XXXX | XXXX | PAGE 2 | PLANE 2 |

FIG. 8b

TABLE 3
MODE 1: BY-1

| | | | | | | | |
|---|---|---|---|---|---|---|---|
| 011 | 1111 | 1111 | 2222 | 2222 | 2233 | | |
| 901 | 2345 | 6789 | 0123 | 4567 | 8901 | | |
| 1XX | 100X | XXXX | XXXX | XXXX | XXXX | PAGE 1 | PLANE 1 |
| 1XX | 101X | XXXX | XXXX | XXXX | XXXX | PAGE 2 | PLANE 1 |
| 1XX | 110X | XXXX | XXXX | XXXX | XXXX | PAGE 3 | PLANE 1 |
| 1XX | 111X | XXXX | XXXX | XXXX | XXXX | PAGE 4 | PLANE 1 |

TABLE 4
MODE N: BY-N

| | | | | | | | |
|---|---|---|---|---|---|---|---|
| 011 | 1111 | 1111 | 2222 | 2222 | 2233 | | |
| 901 | 2345 | 6789 | 0123 | 4567 | 8901 | | |
| 100 | 000X | XXXX | XXXX | XXXX | XXXX | PAGE 1 | PLANE 1 |
| 100 | 001X | XXXX | XXXX | XXXX | XXXX | PAGE 2 | PLANE 1 |
| 100 | 010X | XXXX | XXXX | XXXX | XXXX | PAGE 1 | PLANE 2 |
| 100 | 011X | XXXX | XXXX | XXXX | XXXX | PAGE 2 | PLANE 2 |
| 100 | 100X | XXXX | XXXX | XXXX | XXXX | PAGE 1 | PLANE 3E |
| 100 | 101X | XXXX | XXXX | XXXX | XXXX | PAGE 2 | PLANE 3E |
| 100 | 110X | XXXX | XXXX | XXXX | XXXX | PAGE 1 | PLANE 4E |
| 100 | 111X | XXXX | XXXX | XXXX | XXXX | PAGE 2 | PLANE 4E |
| 101 | 000X | XXXX | XXXX | XXXX | XXXX | PAGE 1 | PLANE 5E |
| 101 | 001X | XXXX | XXXX | XXXX | XXXX | PAGE 2 | PLANE 5E |
| 101 | 010X | XXXX | XXXX | XXXX | XXXX | PAGE 1 | PLANE 6E |
| 101 | 011X | XXXX | XXXX | XXXX | XXXX | PAGE 2 | PLANE 6E |
| | | | | * | * | * | |
| 111 | 110X | XXXX | XXXX | XXXX | XXXX | PAGE 1 | ALL PLANE |
| 111 | 111X | XXXX | XXXX | XXXX | XXXX | PAGE 2 | ALL PLANE |

FIG. 9

```
* = AND    + = OR

CAS 1= (MODE4*DISPLAY) + (MODE4*MPU*ADR13) +
       (MODE2*DISPLAY) + (MODE2*MPU*ADR13*NADR30) +
       (MODE1*DISPLAY) + (MODE1*MPU*ADR12*NADR13*NADR30) +
       (MODEN*DISPLAY) + (MODEN*MPU*ADR9*NADR10*NADR11*NADR12*
                          NADR13*NADR30)

CAS 2= (MODE4*DISPLAY) + (MODE4*MPU*ADR12) +
       (MODE2*DISPLAY) + (MODE2*MPU*ADR13*ADR30) +
       (MODE1*DISPLAY) + (MODE1*MPU*ADR12*NADR13*ADR30) +
       (MODEN*DISPLAY) + (MODEN*MPU*ADR9*NADR10*NADR11*NADR12*
                          NADR13*ADR30)

CAS 3= (MODE4*DISPLAY) + (MODE4*MPU*ADR11) +
       (MODE2*DISPLAY) + (MODE2*MPU*ADR12*NADR30) +
       (MODE1*DISPLAY) + (MODE1*MPU*ADR12*ADR13*NADR30) +
       (MODEN*DISPLAY) + (MODEN*MPU*ADR9*NADR10*NADR11*NADR12*
                          ADR13*NADR30)

CAS 4= (MODE4*DISPLAY) + (MODE4*MPU*ADR10) +
       (MODE2*DISPLAY) + (MODE2*MPU*ADR12*ADR30) +
       (MODE1*DISPLAY) + (MODE1*MPU*ADR12*ADR13*ADR30) +
       (MODEN*DISPLAY) + (MODEN*MPU*ADR9*NADR10*NADR11*NADR12*
                          ADR13*ADR30)
```

| A3A2A1A0 | V5 | V4 | V3 | V2 | V1 | V0 | PALETTE WORD# |
|---|---|---|---|---|---|---|---|
| 0 0 0 0 | 0 | 0 | 0 | 0 | 0 | 0 | 0 |
| 0 0 0 1 | 0 | 0 | 0 | 0 | 0 | 1 | 1 |
| 0 0 1 0 | 0 | 0 | 0 | 0 | 1 | 0 | 2 |
| 0 0 1 1 | 0 | 0 | 0 | 0 | 1 | 1 | 3 |
| 0 1 0 0 | 0 | 0 | 0 | 1 | 0 | 0 | 4 |
| 0 1 0 1 | 0 | 0 | 0 | 1 | 0 | 1 | 5 |
| 0 1 1 0 | 0 | 0 | 0 | 1 | 1 | 0 | 6 |
| 0 1 1 1 | 0 | 0 | 0 | 1 | 1 | 1 | 7 |
| 1 0 0 0 | 0 | 0 | 1 | 0 | 0 | 0 | 8 |
| 1 0 0 1 | 0 | 0 | 1 | 0 | 0 | 1 | 9 |
| 1 0 1 0 | 0 | 0 | 1 | 0 | 1 | 0 | 10 |
| 1 0 1 1 | 0 | 0 | 1 | 0 | 1 | 1 | 11 |
| 1 1 0 0 | 0 | 0 | 1 | 1 | 0 | 0 | 12 |
| 1 1 0 1 | 0 | 0 | 1 | 1 | 0 | 1 | 13 |
| 1 1 1 0 | 0 | 0 | 1 | 1 | 1 | 0 | 14 |
| 1 1 1 1 | 0 | 0 | 1 | 1 | 1 | 1 | 15 |

PALETTE WORD#

| A3A2A1A0 | V5 | V4 | V3 | V2 | V1 | V0 | PALETTE WORD# | |
|---|---|---|---|---|---|---|---|---|
| 0 0 0 0 | 0 | 0 | 0 | 0 | 0 | 0 | 0 | BLACK |
| 0 0 0 1 | 0 | 0 | 1 | 1 | 1 | 1 | 1 | WHITE |
| 0 0 1 0 | 0 | 0 | 0 | 1 | 0 | 0 | 2 | RED |
| 0 0 1 1 | 0 | 0 | 0 | 0 | 1 | 0 | 3 | GREEN |
| 0 1 0 0 | 0 | 0 | 0 | 0 | 0 | 1 | 4 | BLUE |
| 0 1 0 1 | 0 | 0 | 0 | 1 | 1 | 0 | 5 | YELLOW |
| 0 1 1 0 | 0 | 0 | 0 | 0 | 1 | 1 | 6 | CYAN |
| 0 1 1 1 | 0 | 0 | 0 | 1 | 0 | 1 | 7 | MAGENTA |
| 1 0 0 0 | 0 | 0 | 1 | 1 | 1 | 1 | 8 | WHITE |
| 1 0 0 1 | 0 | 0 | 1 | 1 | 1 | 1 | 9 | WHITE |
| 1 0 1 0 | 0 | 0 | 1 | 1 | 1 | 1 | 10 | WHITE |
| 1 0 1 1 | 0 | 0 | 1 | 1 | 1 | 1 | 11 | WHITE |
| 1 1 0 0 | 0 | 0 | 1 | 1 | 1 | 1 | 12 | WHITE |
| 1 1 0 1 | 0 | 0 | 1 | 1 | 1 | 1 | 13 | WHITE |
| 1 1 1 0 | 0 | 0 | 1 | 1 | 1 | 1 | 14 | WHITE |
| 1 1 1 1 | 0 | 0 | 1 | 1 | 1 | 1 | 15 | WHITE |

| | V5 | V4 | V3 | V2 | V1 | V0 | PALETTE WORD# |
|---|---|---|---|---|---|---|---|
| 0 0 0 0 | 0 | 0 | 0 | 0 | 0 | 0 | 0 |
| 0 0 0 1 | 1 | 0 | 1 | 1 | 0 | 1 | 1 |
| 0 0 1 0 | 1 | 0 | 0 | 0 | 0 | 0 | 2 |
| 0 0 1 1 | 0 | 0 | 0 | 0 | 0 | 1 | 3 |
| 0 1 0 0 | 0 | 0 | 1 | 0 | 0 | 0 | 4 |
| 0 1 0 1 | 1 | 0 | 0 | 0 | 0 | 1 | 5 |
| 0 1 1 0 | 0 | 0 | 1 | 0 | 0 | 1 | 6 |
| 0 1 1 1 | 1 | 0 | 1 | 0 | 0 | 0 | 7 |
| 1 0 0 0 | 1 | 0 | 1 | 1 | 0 | 1 | 8 |
| 1 0 0 1 | 1 | 0 | 1 | 1 | 0 | 1 | 9 |
| 1 0 1 0 | 1 | 0 | 1 | 1 | 1 | 1 | 10 |
| 1 0 1 1 | 1 | 0 | 1 | 1 | 0 | 1 | 11 |
| 1 1 0 0 | 1 | 0 | 1 | 1 | 0 | 1 | 12 |
| 1 1 0 1 | 1 | 0 | 1 | 1 | 0 | 1 | 13 |
| 1 1 1 0 | 1 | 0 | 1 | 1 | 0 | 1 | 14 |
| 1 1 1 1 | 1 | 0 | 1 | 1 | 0 | 1 | 15 |

PROGRAMMABLE MULTI-FORMAT DISPLAY CONTROLLER

CROSS-REFERENCE TO RELATED APPLICATION

This application is a continuation of application Ser. No. 07/246,726, filed Sep. 20, 1988, now abandoned.

BACKGROUND OF THE INVENTION

1. Field of the Invention

The present invention relates to information handling systems, and more particularly, to the computer memory organization and memory output in graphics display devices.

2. Background Art

Graphics display systems typically receive information for presentation on a video display device in the form of encoded data. The information is stored in a bit plane memory which is organized in a manner that allows it to be scanned by the display controller and converted into control signals to create a final display image. The bit plane memory of a particular display controller is usually organized in a manner that supports the type of video display device for which the controller was designed. For example, the display controller may provide high, medium, or low resolution and support one or more "pages" of data for the display. Accordingly, bit plane data transmitted to the display controller from, for example, an application program, would be stored in the bit plane memory in the format necessary to generate signals for the particular video display.

FIG. 1 depicts a conventional display controller. The application program (running in processor 105) provides a bit plane address 102 indicative of position on the video display for which data is being transmitted. Bit plane data 104 is transmitted from the processor and contains encoded values representing the content of the display. The display controller causes the bit plane data 104 to be stored in bit plane memory 106 at the address specified by bit plane address 102. The display controller causes bit plane memory 106 to be periodically scanned, with the data being converted into serial signals for controlling the video display device by video shift registers 108. Finally, the signals are transmitted to the video display through video connector 110.

A display controller constructed according to conventional techniques is limited to use with the display devices for which it was designed. The introduction of a new, improved video display with, for example, a video connector with different pin assignments, or a different screen display size, is useless with the existing display controller.

A second problem is the need to store data into multiple planes. The display screen is generated as a plurality of scan rows each comprised of a plurality of individual picture elements referred to as pixels or pels. An image is created by having each pel be either on or off. Each pel can therefore be encoded as a single binary unit, or bit, that is either on (1) or off (0). The representation of colors or multiple shades of gray requires an encoding scheme with more than one bit per pel. The use of three bits allows the encoding of $2^3$ or 8 colors or shades of gray, for example. Each additional bit creates an additional "plane" of the encoded image. In the example three bit planes are used to store the encoded image.

A character may be generated based on a stored image of the character. The character image, e.g. A, is displayed in a selected foreground color and the background of the character box in a selected background color. In a monochrome, or single bit per pixel memory, the character box and image is simply copied into the bit plane with the image "on" (1) and the background "off" (0).

The use of a display device which allows colors or multiple shades of gray and thus has multiple bit planes, requires a cumbersome analysis to determine the image to be written to each bit plane. In the prior art systems each plane is then written sequentially.

The present invention is directed towards providing a programmable display controller that allows for the creation of multi-format bit planes which in turn may be transmitted to a variety of video displays through a programmable video connector. The present invention is further directed toward providing a display controller that can simultaneously store data in multiple planes of bit plane memory 106.

BRIEF DESCRIPTION OF THE DRAWINGS

FIG. 4*a* illustrates the coding of data for a monochrome display according to the present invention.

FIG. 4*b* illustrates the encoding of data for a color display according to the present invention.

FIG. 5*a* is a block diagram illustrating a logic component of multiple store logic according to the present invention.

FIG. 5*b* illustrates the control assignments multiple store controller according to the present invention.

FIG. 7 is a block diagram illustrating the principal components of the bit plane memory control logic according to the present invention.

FIG. 8 illustrates the address assignment according to the present invention.

FIG. 9 illustrates the logic equations for the selection of column address select lines according to the present invention.

DESCRIPTION OF THE PREFERRED EMBODIMENT

Figure 2:
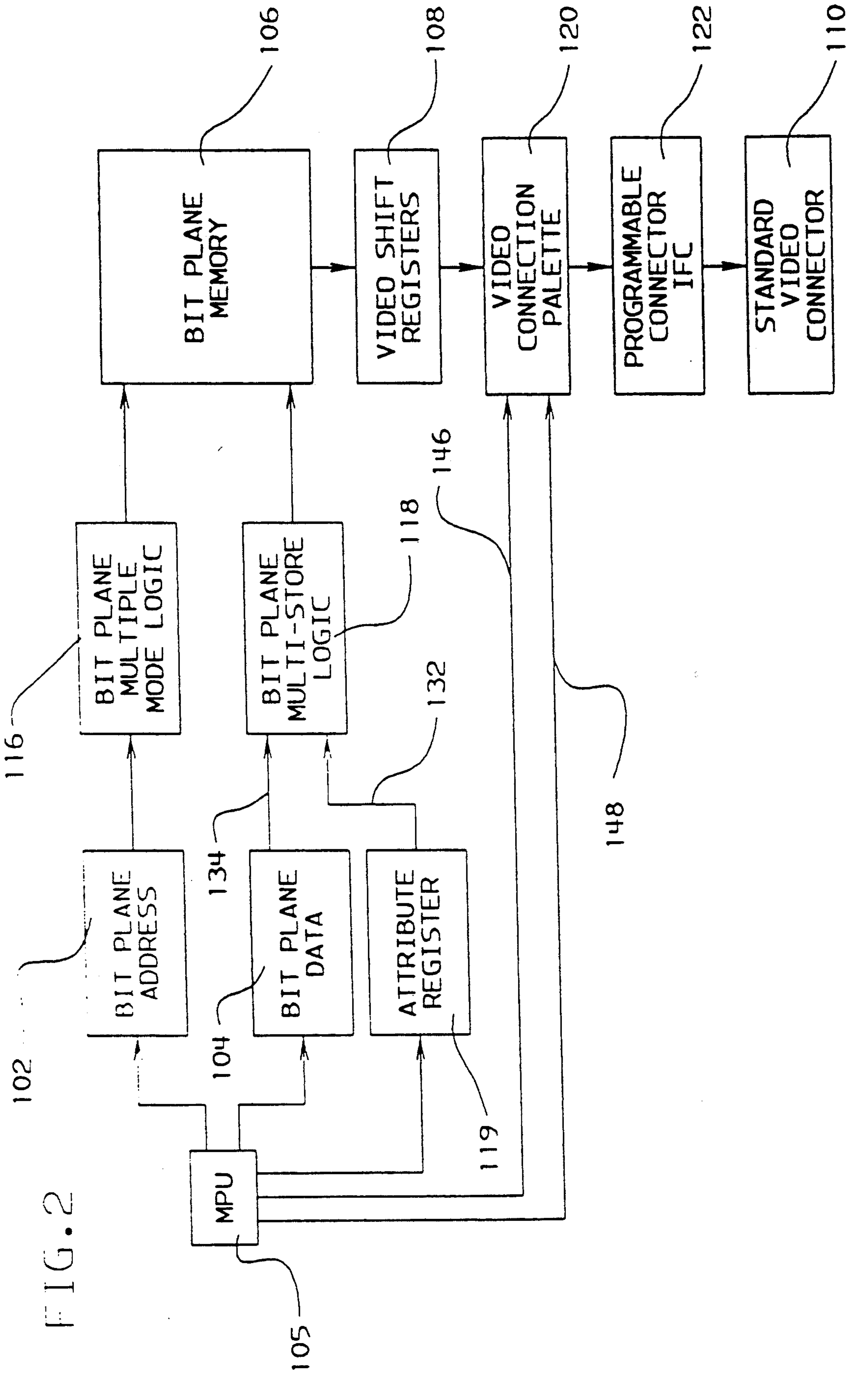
FIG. 2 is a block diagram illustrating the principal components of a display controller in accordance with the present invention.

A display controller according to the present invention is shown in FIG. 2. Like reference numbers in different figures refer to the same elements. In addition to display controller elements described with respect to the background art, the present invention introduces four new elements to provide programmable multi-format interface features. Bit plane multiple mode logic 116 and bit plane multi-store logic 118 allow for the reconfiguration of bit plane memory as required to support various video displays. Video connection palette 120 and programmable connector interface 122 allow the conversion of the serialized output data to the form necessary for connection through a standard video connector.

Figure 1:
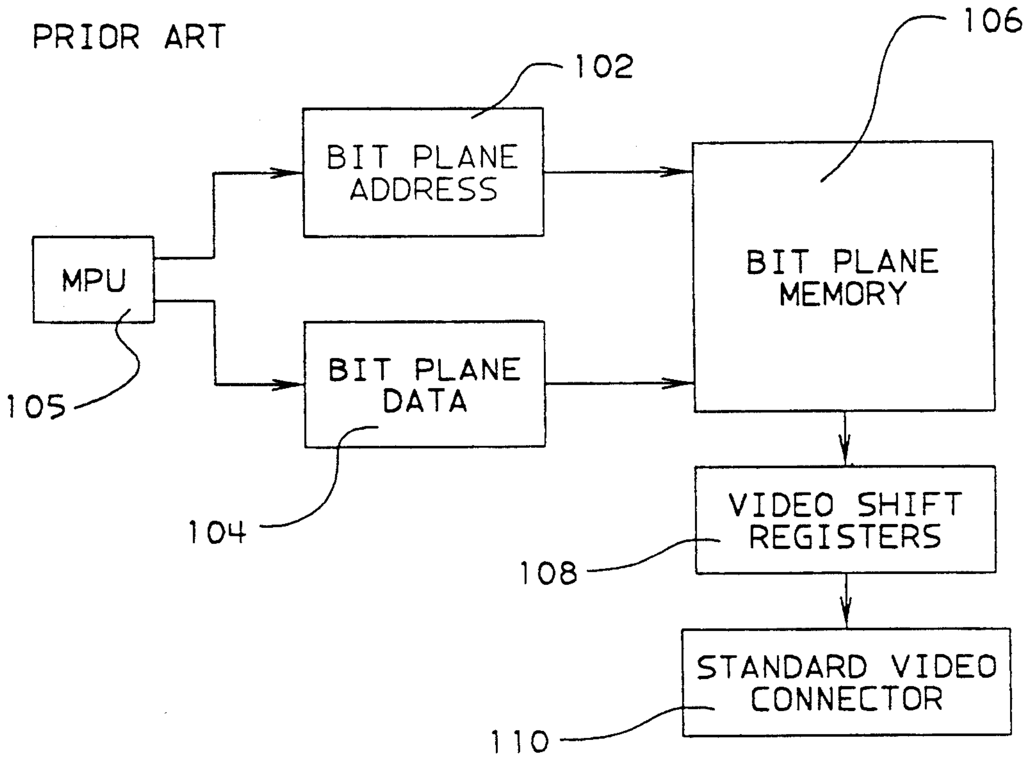
FIG. 1 PRIOR ART
FIG. 1 is a block diagram illustrating a display controller constructed according to conventional prior art techniques.
Figure 3A:
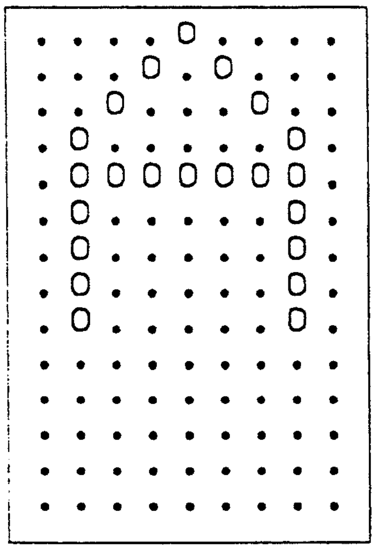
FIG. 3*a* illustrates the representation of a character to be displayed using a display controller.
Figure 3B:
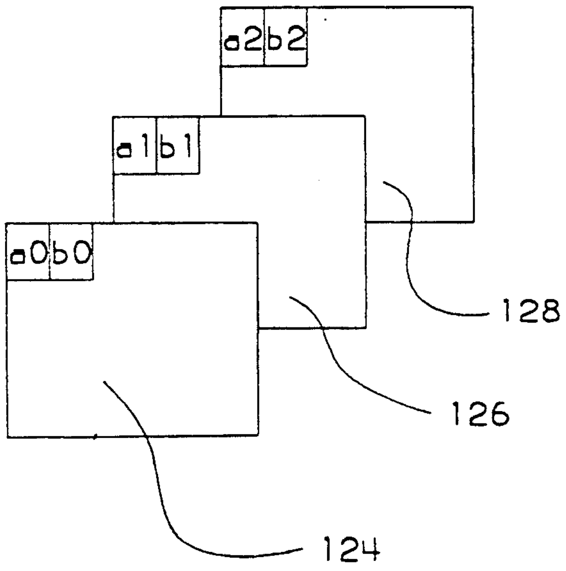
FIG. 3*b* illustrates the storage of picture element data on multiple bit planes.

Bit plane multiple mode logic 116 and bit plane multi-store logic 118 allow the programmable reconfiguration of bit plane memory 106. The use of color video displays or displays which provide multiple shades of gray requires storage of more than one bit of data for each picture element (pel) on the video display. The number of colors or shades of gray supported by the video display device affects the number of bit planes required to store the data necessary to generate each picture element. In the simplest case, a monochrome display, only one bit is required for each pel. That bit can either be turned off indicating that a background color should be displayed, or on indicating that a designated foreground color should be displayed. (See FIG. 3*a*). As more colors are added, more bits are necessary to represent the color to be displayed at a particular location ion the video display. For example, if three bits are used to represent each pel, $2^3$ or 8 colors may be selected. The bit plane memory 106 is typically organized into planes with each plane having one bit for each pel on the video display. Thus, the use of three bits per pel will require the provision of three bit planes as shown in FIG. 3*b* where bit planes 124, 126 and 128 each contain the data necessary to generate the pels of a screen. The first pel position on the screen is generated with reference to the bits labelled a0, a1 and a2, with second pel represented by bits b0, b1 and b2.

FIGS. 4*a* and 4*b* illustrate how foreground and background colors for a character are specified for three bit planes. A character generator typically has a stored image, like FIG. 3*a*, indicating the state of each pel within a character box (in this example the box is 9 pels by 13 pels.) When the application program requires the display of a character it will transmit a code for the required image plus the required foreground and background colors. The display controller must determine the data to place in each bit plane so the final display will correctly represent the required character. Tables 4*a* and 4*b* are used to determine the treatment of the image and background in each plane for a specified foreground and background shade of color. FIG. 4*a* illustrates the options for foreground and background gray shades for a display which supports multiple shades of gray. FIG. 4*b* illustrates the specifications for a color display.

In FIG. 4*a* the degree of intensity is increased by placing non-zero values in corresponding positions in several bit planes. Thus, when the corresponding positions in all bit planes have non-zero values, the brightest display is obtained. Placing a non-zero value in the first plane, labelled "4", will give a pel about half as bright as when all planes have non-zero bits, and placing zero values in all planes results in a black display.

Each bit plane stores information representing the foreground and background shades for a character. In some cases it is necessary to store the negative image of a character in a bit plane to achieve the proper result. The image of a character is the set of pels represented by 0's in FIG. 3*a*. A positive image is created by turning on ("1") the bits associated with the image and turning off ("0") the remaining bits in the character box. A negative image reverses this and turn off the bits associated with the image and turns on the remaining bits in the character box. For example, to display a light gray character (shade 1) on a white background (shade 6) the positive image of the character is placed in the "1" bit plane to give a shade 1 foreground, but the negative image of the character must be placed into the "4" and "2" bit planes to have only the background be shade 6. If all 1's (a positive image) were placed in the "4" and "2" planes the result would be a bright character on a shade 6 background.

FIG. 4*b* shows a foreground and background table for an 8 color display in form similar to FIG. 4*a*. The three planes are used to provide red, blue and green colors instead of multiple gray shades. The combination of the various foreground or background colors can be determined by cross-referencing in the tables.

The software necessary to correctly process foreground and background combinations in existing systems is fairly cumbersome. A translation table similar to FIG. 4*a* and 4*b* must be constructed in order to determine what data must be stored in each plane and then data must be stored to those planes in separate operations. The present invention provides a way to make a single determination of the data to be written into each plane for the character box and then to perform the required store operations in parallel. This results in a considerable performance increase over existing display controller systems.

FIG. 5*a* illustrates a logic element that permits, parallel store operations. An attribute register 119 (FIG. 2) is established to provide control signals 132. The possible values for control signals 132 are shown in the table in FIG. 5*b*. Logic block 130 will do four things, depending on the control signals: pass the data on its input 134 to its output 136; set all outputs to 1's regardless of the state of the inputs; set all outputs to 0's regardless of the state of the inputs; and set the outputs equal to the 1's complement of the inputs (negative of the inputs). Bit plane multiple store logic 118 is comprised of one logic block 130 for each plane in the display. In the example, three logic blocks 130 are provided. The register 119 is created based upon the values derived from table 4*a* or 4*b*. Each position in the table value sets the control for a logic block 130 for a bit plane. For example, the first position controls the "4" plane. A "P" in the table value causes a control signal 132 of "00" to be created resulting in the writing of a positive image of the character into the "4" bit plane. This conversion then allows the data storage in the bit planes to proceed simultaneously.

Application of this logic block greatly simplifies the task of generating characters by allowing multiple plane stores to occur simultaneously. The information required to accomplish this task is essentially the contents of the table shown in FIGS. 4*a* and 4*b* and is passed to the display controller through attribute bytes sent from the processor to attribute register 119. In order to further streamline the character generating process, it would be useful to transform the attributes into the forms shown in the tables. In particular, the transformed attributes should be in the format required to control the logic shown in FIG. 5*a*.

Figure 6:
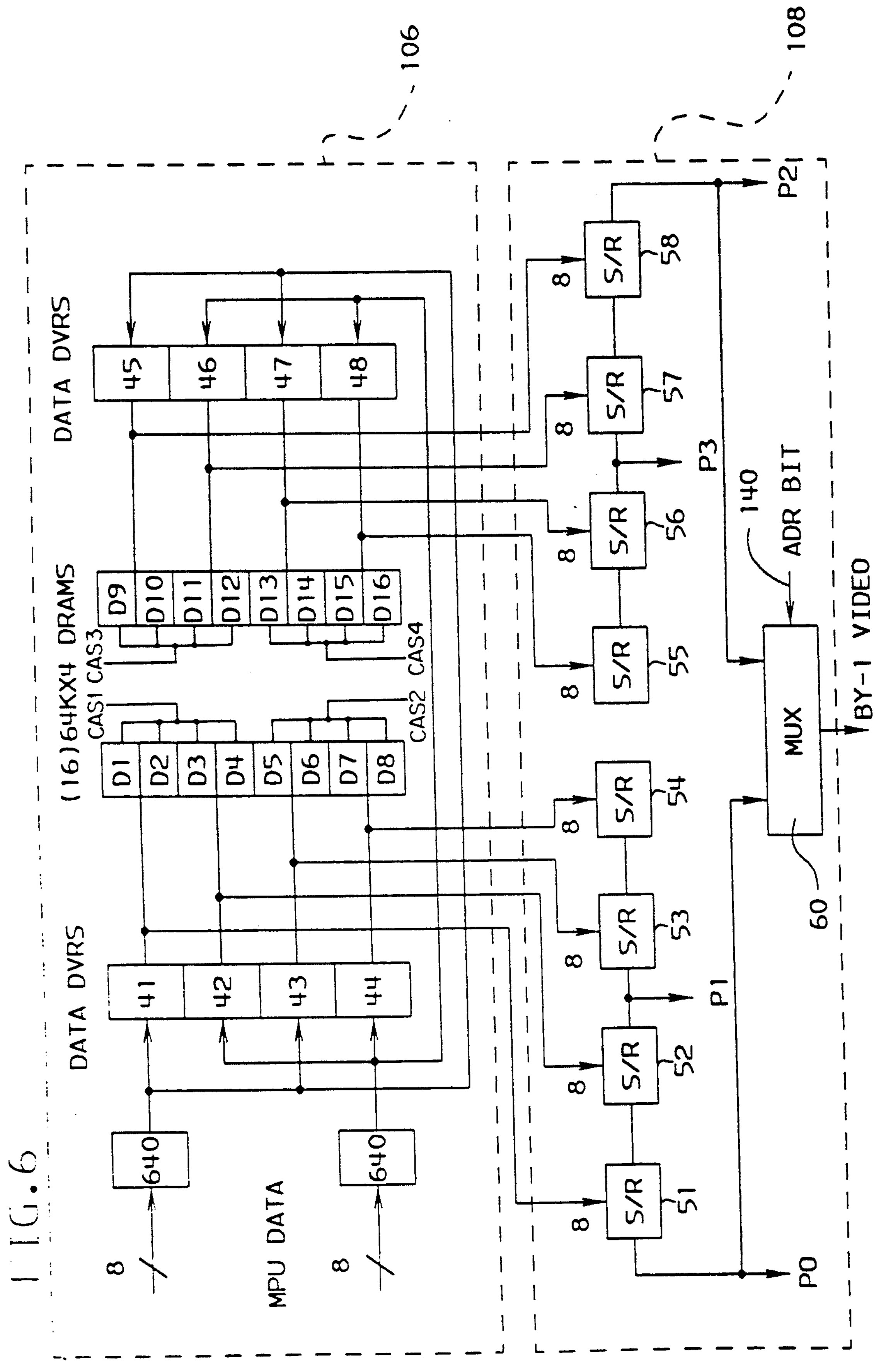
FIG. 6 is a block diagram illustrating the principal components of a bit plane memory and video shift registers according to the present invention.

FIG. 6 illustrates a portion of the display controller architecture according to the present invention which will be used to illustrate the operation of bit plane multimode logic 116. The top portion of FIG. 6 provides greater detail of bit plane memory 106. The bit plane memory is comprised of sixteen 64K×4 dynamic random access memories (DRAMs) labelled D1-D16 in the drawing. Data drivers 41 through 48 are bi-directional tri-state drivers for reading and writing the bit planes from the processor interface. Video shift register 108 is comprised of eight video shift registers 51 through 58. The shift registers combine to provide four primary outputs of the video shift registers labelled P0, P1, P2 and P3. In addition a multiplexer 60 is included to provide a single video signal.

FIG. 7 illustrates in greater detail the connection between bit plane multiple mode logic 116 and bit plane memory 106. Multiple mode logic 116 provides four addressing lines labelled CAS1-CAS4. These column address select (CAS) lines activate individual DRAM chips when it is necessary to read or write to the memory subsystem. The DRAMs of the bit plane memory are connected to the CAS lines so that CAS1 controls DRAMs D1-D4, CAS2 controls D5-D8, CAS3 controls D9-D12, and CAS4 controls D13-D16. The logic of the CAS lines is a function of system control and timing signals as well as processor address bits. The present invention relates to the design and assignment of CAS lines to select DRAM modules as a function of the bit plane format.

The bit plane format is selected based upon the desired resulting display. The number of picture elements or pels displayable vertically and horizontally varies between video displays. Horizontal and vertical pel counts are also a function of the desired resolution of the final images, and the number of colors or shades of gray desired. The selection of the screen format requires that the bit plane memory 106 be allocated as necessary to support the screen display. In the example shown in FIG. 6, bit plane memory includes a total of 512K bytes. For a final screen display of 768 pels horizontally by 350 pels vertically the bit plane memory 106 can be divided into four planes with four pages. This will be labelled mode 4. Additional bit plane memories are: Mode 1—screen of 1024×1024—one plane with four pages; Mode 2—1024×1024 with two planes with two pages; mode n—1024×1024 n planes with two pages, mode n, where n=2, 3, . . . , 15. (Mode n with more than two planes would require the addition of bit plane memory beyond 512K bytes.)

The term "page" refers to the ability to store extra or shadow screens full of data that can quickly become the primary or displayable screen by changing the address to the bit planes. These can be used for quick screen update by allowing the processor to fill the shadow page with new information while the terminal user is viewing the primary page. When the new shadow pages are ready they can be switched to become the primary page allowing that to be viewed. Each page is comprised of the full number of planes, e.g. four.

In all four modes, the number of displayable pels can be traded off against the number of shadow pages allowed. For example mode 2 can support 1024×1024 planes with two pages or 768×702 planes with four pages. Mode 4 above generates four planes each having four pages. The planes are each associated with a video output labelled P0, P1, P2, and P3 in FIG. 6. The DRAMs are connected so that D1-D4 are combined to create P0, D5-D8 to create P1, D9-D12 to create P2, and D13-D16 to create P3. Since the column address select (CAS) lines 1-4 are similarly connected, the selection of the column address select lines allows access to the planes for reading or writing purposes The shift registers are reloaded from the bit planes for display after shifting sixteen bits out to video outputs P0-P3. CAS1-4 are activated individually by the processor to read or write data to a plane in the bit plane memory 106 and are activated simultaneously during the selection of data for display.

Selection of mode 1 above provides one 1024×1024 plane of video output with four pages. A single output P0 or P2 is selected based on a selection address bit 140. Each time the bit planes are read for screen display purposes in this mode, all sixteen DRAM modules are selected simultaneously. DRAM modules 1-8 are accessed and read into shift registers 51-54 and DRAM modules 9-16 are accessed and read into shift registers 55-58. The shift registers are reloaded from the bit planes after 32 bits of video are serially shifted out to the video output. The selection address bit 140 is used by multiplexer 60 to select either P0 or P2 for output to the single "BY-1" video output. CAS1 and CAS2 are activated for pages 1 and 2 of the display while CAS3 and CAS4 are activated for pages 3 and 4. For mode 2 having two planes of video output with two pages, the two video outputs labelled P0 and P2 are generated. DRAM modules D1-D8 support the first plane of video output and are selected by CAS1 and CAS2. Modules D9-D16 support plane 2 and are activated by CAS3 and CAS4.

The fourth mode, mode n uses the similar CAS line assignments.

In summary, for display access, all four CAS lines are activated simultaneously and the video control logic which directs shifting through shift registers controls the proper display of 1, 2, 4 or n planes. Processor access to bit plane memory 106 is controlled by bit plane multi-store logic 118 which controls the column address select lines CAS1-CAS4. These lines are controlled to provide the appropriate reading and writing to the bit plane memory.

Bit plane multiple mode logic 116 is controlled by the bit plane address 102 passed from the processor unit 105. Tables 1-4 produced in FIG. 8 illustrate the address assignments for the various modes. Modes 1, 2 and 4 provide an address with a single bit designated for each plane to be accessed. This allows simultaneous multi-plane write or store operations. Since the addresses for the individual planes are not encoded, it is possible to write 1, 2, 3 or 4 planes simultaneously by simply activating the correct address bits for the desired planes. This is valuable for clearing the screen for area fills for 2 and 3 gun colors such as pink and yellow. The fourth mode that allows up to fifteen planes does not have a simultaneous multi-plane store capability since the plane address bits are encoded.

The present invention can be extended to other modes such as eight planes, and other formats such as 1280×1024. The description of the preferred embodiment discloses a specific set of modes, but it will be clear to those skilled in the art that it can be readily extended to other formats.

FIG. 9 illustrates the logic equations used to implement this plane addressing scheme.

The activation of CAS1–4 depends on the following logic signals:

Mode—indicating the required mode (1–4, n)

Display—indicating memory is being accessed for display

MPU—indicating the MPU is writing data to memory

ADRxx—the value of address line xx

NADRxx—the inverse of the value of address line xx.

These logic equations implement Tables 1–4 of FIG. 8*a*. Implementation of a new display format would require only modification of this logic. No other hardware modification to the display controller is required, thus simplifying new format implementation. In particular, it reflects the fact that all CAS lines are activated for display, and selected CAS lines are accessed based on the mode and necessary address bits. This logic is implemented in multiple mode logic 116. In the preferred embodiment, this logic has been implemented using hardware components, however it will be clear that equivalent results can be accomplished using software.

Video connection palette 120 and programmable connector interface 122 are used to convert the output of video shift registers 108 into the form necessary to cause the selected video display to produce the desired image. The present invention discloses a flexible palette and interface that allows the display controller to be used with a variety of video display systems. The output of programmable connector interface 122 consists of a horizontal synchronization signal (HSync), and a vertical synchronization signal (VSync), one to six video output lines, and a ground. The present invention provides for a programmable interface which allows the video output signals to be assigned to any of pins 2–7 in a standard video connector in such a manner to allow reconfiguration as required to support a particular video monitor.

Figure 10:
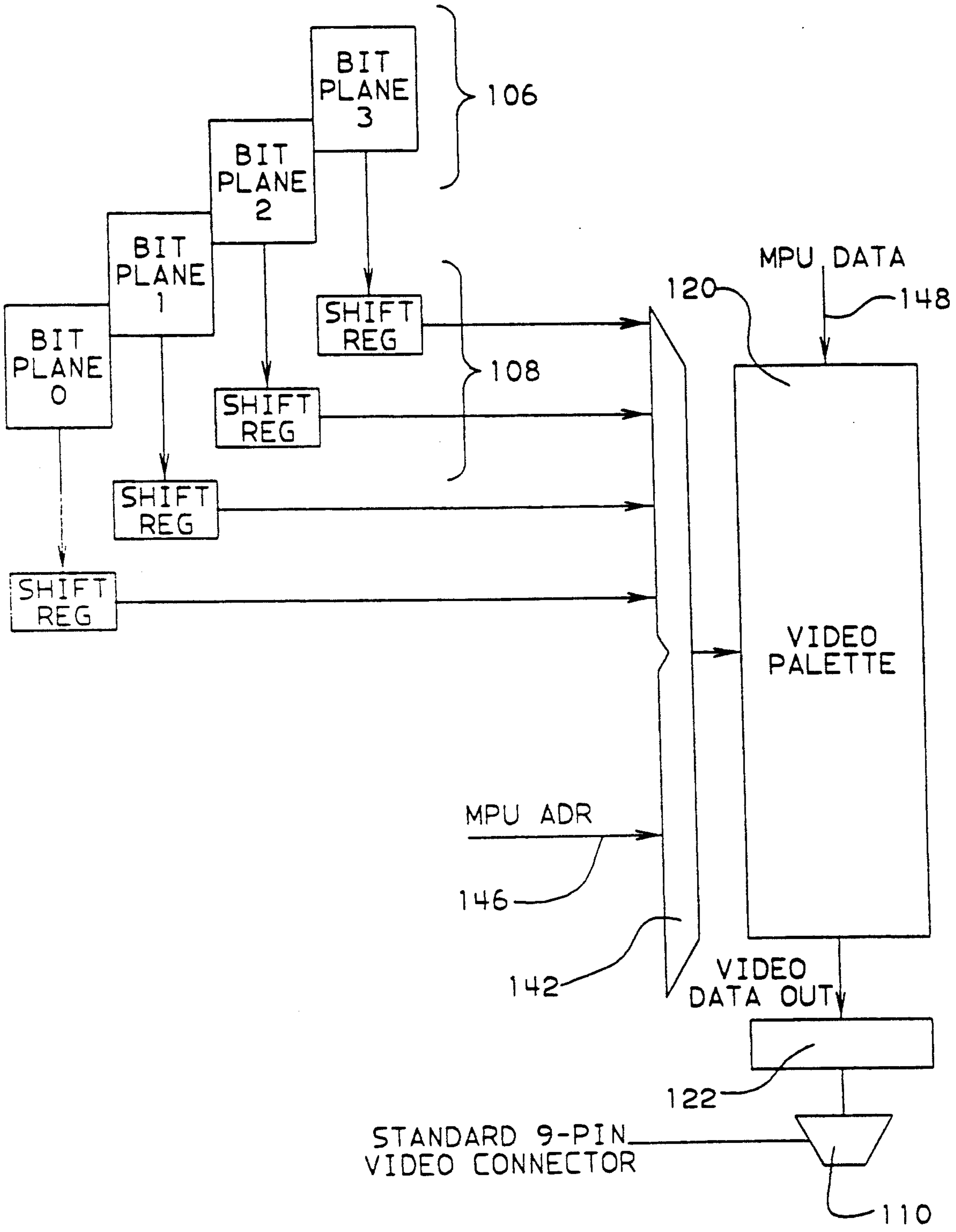
FIG. 10 is a block diagram illustrating a video connection palette and programmable connector interface according to the present invention.

FIG. 10 illustrates the operation of video palette 120 according to the present invention. Display data from bit planes 0–3 of bit plane memory 106 are read and passed through shift register 108 to produce four serial signals that serve as input to the video palette. (This example illustrates the use of a four-plane bit plane memory, when a single plane or two plane mode is used, only one or two signals will be passed to the video palette.) The output of the video palette is fed through connector interface 122 and into the standard video connector 110. In addition, the video palette 120 has inputs for processing an address 146 and processing unit data 148. Processor data 148 is used to load the video palette with the necessary translation table. Loading of the table is directed by processor address 146. Address selector and decoder 142 converts the processor and video plane data into the form necessary to address the video palette.

The operation of the video connection palette and programmable connector interface is illustrated with reference to FIGS. 11–16. As stated above, the video palette serves to translate the outputs of, for example, four bit planes into the signals necessary to control the video display. As shown in FIG. 10, the use of four bit planes means that the palette can be used to address $2^4$ or 16 words of palette data. The number of bits in a particular palette word is dependent upon the number of video output lines required to control the selected monitor. If the number of video output lines necessary is equal to six and there are four planes used to address the palette, then the palette is able to provide for the display of any 16 colors out of a palette of 64 colors ($2^6$).

Figure 11:
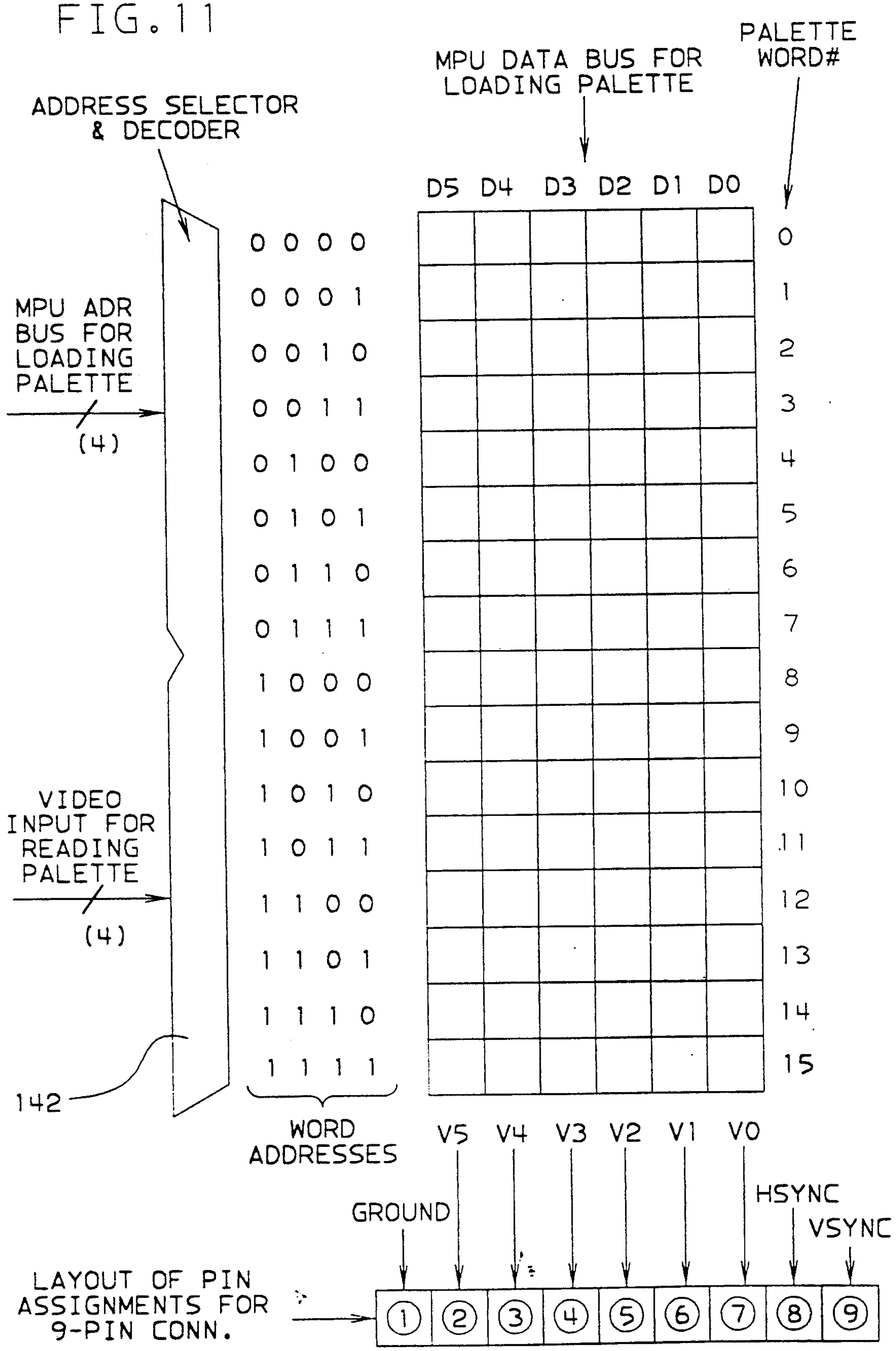
FIG. 11 illustrates the assignment of output signals to the use of the programmable video palette according to the present invention.

FIG. 11 illustrates how the palette words are addressed and passed to the video connector. The use of a programmable palette allows a display controller according to the present invention to be used to drive any monitor which has a standard nine-pin connector. Most monitors have the horizontal synchronization (HSync) signal on the pin 8, the vertical synchronization (VSync) signal on pin 9, ground on pin 1, and video output signals on pins 2–7 of the connector. Particular monitors will have from 1–6 video lines on those pins. By loading separate palettes, the display controller according to the present invention can work with this variety of monitors. For example, FIG. 11 illustrates how the four input plane addresses can be used to generate six video output signals V0–V5 connected to pins 7–2 respectively.

Figure 12:
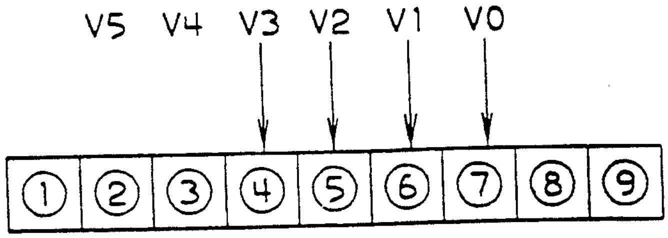
FIGS. 12 through 16 illustrate alternative assignments of output signals.

FIG. 12 illustrates the case where only pins V0–V3 are used to drive the monitor. The palette loaded in this example provides a straight through transformation wherein the output bits reflect the input address bits, in effect selecting 16 colors from a palette of 16 colors. Additional video outputs V4 and V5 are always zero.

Figure 13:
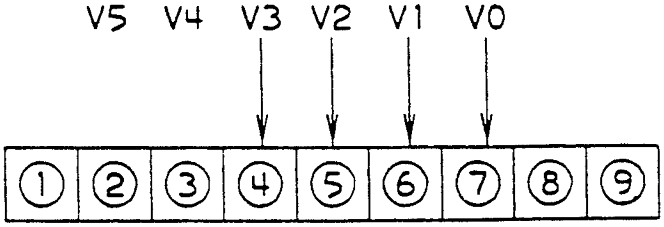

FIG. 13 illustrates the use of a programmable palette for color transformation. This color palette is used to transform the video output to the form used by the virtual device interface, VDI, which is an industry standard for raster graphics. The VDI standard defines the video codes for particular colors. The palette is programmed to achieve the color coding with the monitor of choice which in this case has the blue control attached to connector pin 7. Another monitor might have the blue control attached to connect to pin 4 as shown in FIG. 14.

Figure 14:
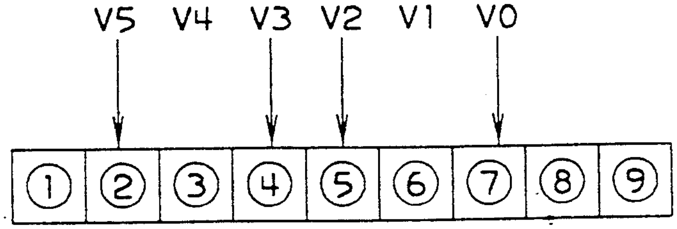

FIG. 14 shows the same VDI transformation but with the video pins redefined for a different color monitor.

Figure 15:
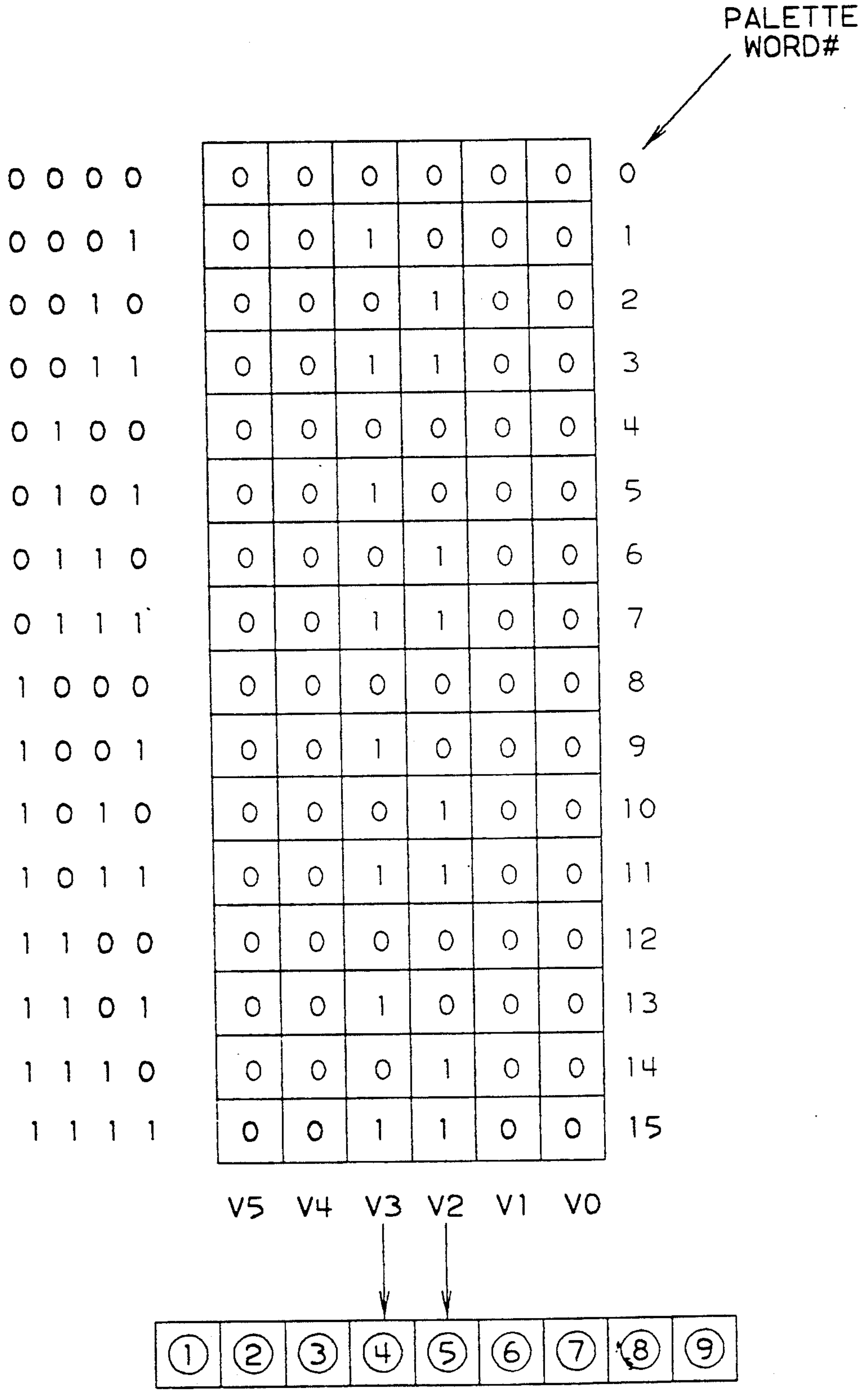

FIG. 15 shows an example of the bit plane video represented by palette address bits 0 and 1 being transformed to control connector pins 4 and 5.

Figure 16:
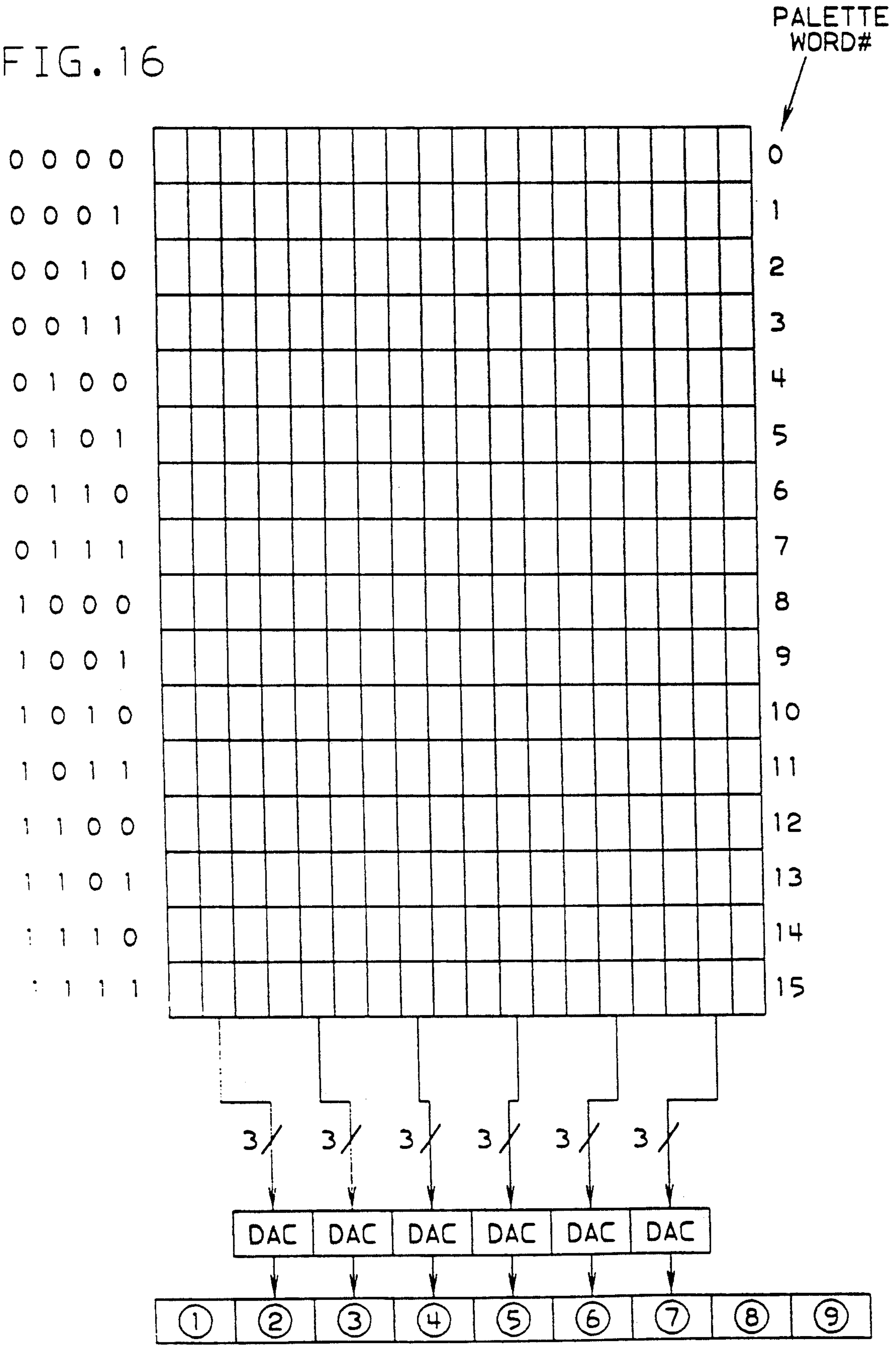

FIG. 16 shows the use of digital to analog converters, DACs, to provide the monitor independent flexibility for analog video devices. In the example each DAC has three digital inputs. This means that each analog video output can support eight video shades. If each DAC has three inputs then to maintain complete flexibility for redirecting the eight shades of blue, green or red, etc. to any of the six connector pins, a palette with an output width of 3×6 or 18 would be required. If each DAC has four inputs a palette with a width of 4×6 or 24 would be required.

Figure 17:
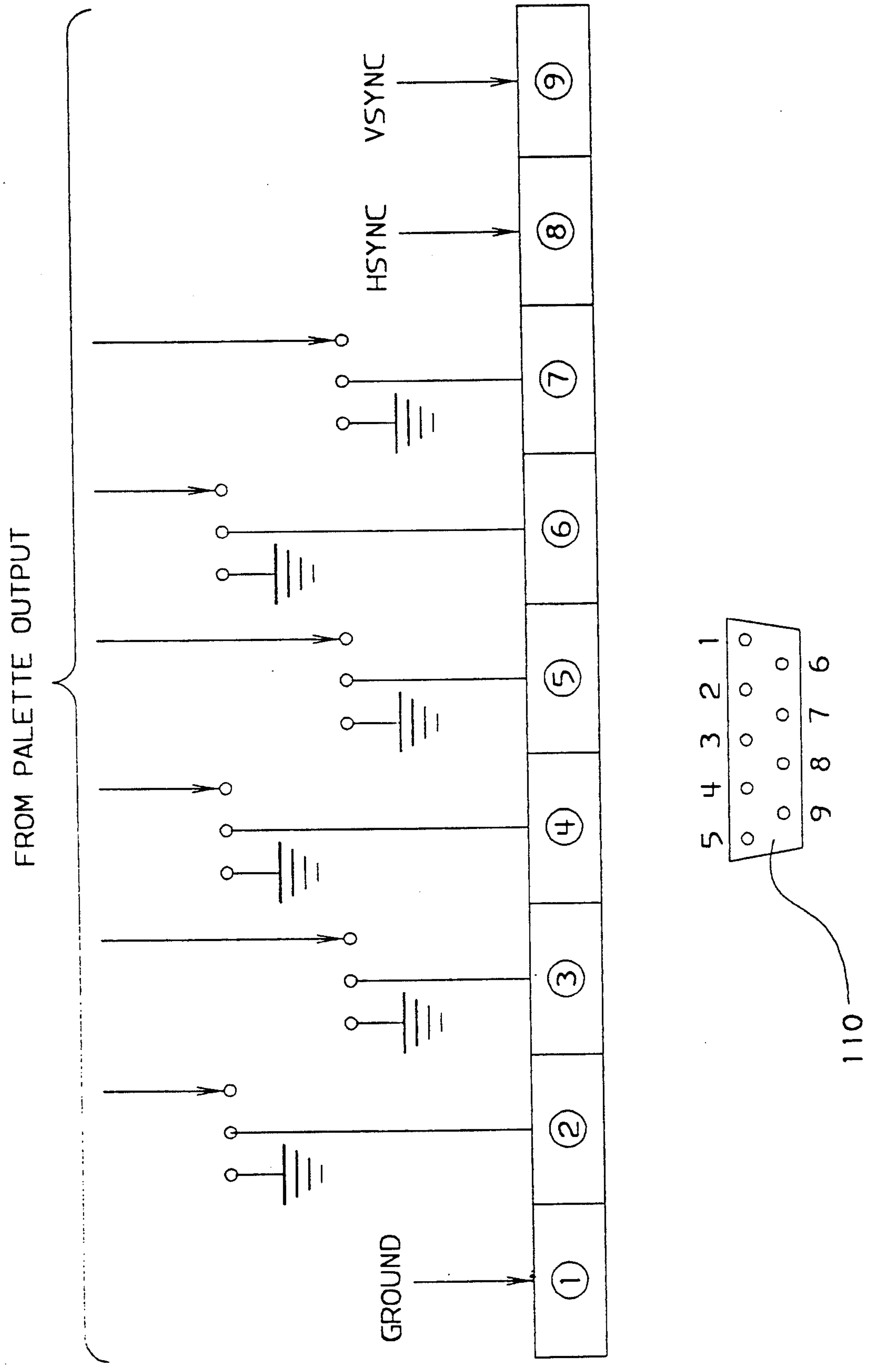
FIG. 17 is a diagram illustrating a connection of pins to the video connector according to the present invention.

FIG. 17 illustrates the connector interface 122 which provides a way to ground any of the video pins 2–7. These grounds may be required by monitors that have less than six video lines. The grounding mechanism in FIG. 17 depends on the use of a three-pin male jumper fixture. Connector pin 2 can be connected to ground via a two-pin female jumper fixture connected to pins A and B in FIG. 17. Connector pin 2 can also be connected to the palette output via a two-pin female jumper fixture across pins B and C. This grounding flexibility is important to allow the invention to work within a particular monitor.

The programmability of the palette combined with the programmable video interface provides an opportunity to support several monitors with a single display controller.

The above description of the preferred embodiment is intended to illustrate the concepts of the present invention. It will be evident to those skilled in the art that alternative techniques for implementing these inventive concepts could be employed, for example, substituting software logic for hardware components and vice versa.

We claim:

1. Apparatus for generating a pixel image for display by a raster scan device, said image comprising foreground pixels and background pixels, each of said foreground and background pixels containing a plurality of bit positions and having a value at each of said bit positions, each of said bit positions having a foreground value and a background value associated therewith such that the foreground pixels have said foreground value at said bit position and the background pixels have said background value at said bit position, said apparatus comprising:

an addressable memory for storing said pixel image, said memory having locations corresponding to said pixels;

means for generating a pixel signal indicating whether a pixel is a foreground pixel or a background pixel;

storage means for storing for each of said bit positions data representing the foreground and background values associated with said bit position for said image; and means responsive to said pixel signal and to said storage means for simultaneously generating the foreground or background values of said pixel, as determined by said pixel signal, for each of said bit positions and for storing said values in said memory at the location corresponding to said pixel.

2. Apparatus as in claim 1 in which said storage means generates one of four outputs for each of said bit positions, said means responsive to said pixel signal and to said storage means being responsive to a first output from said storage means to generate a first logic level irrespective of said pixel signal, being responsive to a second output from said storage means to generate a second logic level irrespective of said pixel signal, being responsive to a third output from said storage means to generate the logic level of said pixel signal, and being responsive to a fourth output from said storage means to generate the complement of the logic level of said pixel signal.

3. Apparatus as in claim 1 in which said memory has memory planes corresponding to said bit positions, each memory plane having locations corresponding to said pixels, said means for simultaneously generating the values of said pixel for each of said bit positions storing said values in the corresponding memory planes at the locations corresponding to said pixel.

4. In a graphics system for generating a pixel image comprising and array of pixels for display by a raster scan device, said system having an addressable memory for storing said pixel image, said memory having locations corresponding to said pixels, apparatus comprising:

an addressable palette containing plural locations corresponding to respective addresses for storing words to be output via output lines to said device, said device being responsive to only a predetermined subset of said output lines, each of said words containing a predetermined number of bits corresponding to the number of said output lines, said bits having an active logic level and an inactive logic level, said palette being responsive to an address input to supply the word stored at the corresponding location to said output lines;

means for supplying an output from a location in said memory as an address input to said palette to cause the corresponding word to be supplied to said device; and means for loading said palette with words determined in accordance with said predetermined subset of said output lines, said loading means being selectively operable to load said palette with words set at said inactive logic level at bit positions corresponding to output lines that are not part of said predetermined subset of said output lines.

* * * * *